United States Patent
Ning et al.

(10) Patent No.: US 12,207,595 B1
(45) Date of Patent: Jan. 28, 2025

(54) MULTIFUNCTIONAL CONTROLLABLE MULTI-LAYER CO-EXTRUDED BIODEGRADABLE MULCHING FILM AND PREPARATION METHOD THEREOF

(71) Applicant: Shandong Agricultural University, Tai'an (CN)

(72) Inventors: Tangyuan Ning, Tai 'an (CN); Zhen Liu, Tai 'an (CN); Geng Li, Tai 'an (CN); Renzheng Zhang, Tai 'an (CN); Zihan Gai, Tai 'an (CN); Rou Chen, Tai 'an (CN); Deheng Zhang, Tai 'an (CN); Zihua Zhou, Tai 'an (CN); Qinglin Zhang, Tai 'an (CN)

(73) Assignee: Shandong Agricultural University, Tai'an (CN)

( * ) Notice: Subject to any disclaimer, the term of this patent is extended or adjusted under 35 U.S.C. 154(b) by 0 days.

(21) Appl. No.: 18/762,770

(22) Filed: Jul. 3, 2024

(30) Foreign Application Priority Data

Oct. 10, 2023 (CN) .......................... 202311303917.4

(51) Int. Cl.
*A01G 13/02* (2006.01)

(52) U.S. Cl.
CPC ............................... *A01G 13/0275* (2013.01)

(58) Field of Classification Search
CPC ............ A01G 13/0256; A01G 13/0275; A01G 13/0281
See application file for complete search history.

(56) References Cited

U.S. PATENT DOCUMENTS

| | | | | |
|---|---|---|---|---|
| 2021/0378184 A1* | 12/2021 | Álvarez Aldoma | | A01G 9/1438 |
| 2022/0332888 A1* | 10/2022 | Zhu | | C08J 5/18 |

FOREIGN PATENT DOCUMENTS

| | | | |
|---|---|---|---|
| CN | 106543668 A | 3/2017 | |
| CN | 106750766 A | 5/2017 | |
| CN | 107365482 A | 11/2017 | |
| CN | 109566210 A | 4/2019 | |
| CN | 110272566 A | 9/2019 | |
| CN | 111903376 A | 11/2020 | |
| CN | 113736233 A | 12/2021 | |
| CN | 114656714 A | 6/2022 | |
| CN | 115521594 A | * 12/2022 | |
| CN | 115612265 A | * 1/2023 | |
| CN | 116041918 A | * 5/2023 | |
| CN | 116535824 A | * 8/2023 | |
| KR | 20140106882 A | 9/2014 | |
| KR | 102058392 B1 | 12/2019 | |

OTHER PUBLICATIONS

First Office Action for China Application No. 202311303917.4, mailed Feb. 20, 2024.
Notification to Grant for China Application No. 202311303917.4, mailed Apr. 28, 2024.
First Search Report for for China Application No. 202311303917.4, dated Feb. 18, 2024.
Supplementary Search Report for for China Application No. 202311303917.4, dated Apr. 23, 2024.

* cited by examiner

*Primary Examiner* — Monica L Perry
*Assistant Examiner* — Aaron M Rodziwicz
(74) *Attorney, Agent, or Firm* — Piloff Passino & Cosenza LLP; Rachel Piloff; Sean Passino

(57) ABSTRACT

A multifunctional controllable multi-layer co-extruded biodegradable mulching film and a preparation method thereof. The multifunctional controllable multi-layer co-extruded biodegradable mulching film sequentially includes a skeleton layer, a functional layer and a controlled release layer from top to bottom; the skeleton layer, functional layer and controlled release layer are all based on PBAT and PLA (polylactic acid) resin; the raw materials of the skeleton layer also include reinforcing and toughening master batches; the raw materials of the functional layer also include functional master batches; the raw materials of the controlled release layer also include starch-based derivatives. The mulching film is prepared by multi-layer co-extrusion technology.

8 Claims, No Drawings

MULTIFUNCTIONAL CONTROLLABLE MULTI-LAYER CO-EXTRUDED BIODEGRADABLE MULCHING FILM AND PREPARATION METHOD THEREOF

CROSS-REFERENCE TO RELATED APPLICATIONS

This application claims priority to Chinese Patent Application No. 202311303917.4, filed on Oct. 10, 2023, the contents of which are hereby incorporated by reference.

TECHNICAL FIELD

The present disclosure belongs to the technical field of agricultural mulching film materials, and in particular to a multifunctional controllable multi-layer co-extruded biodegradable mulching film and a preparation method thereof.

BACKGROUND

Poly (butylene adipate-co-terephthalate) (PBAT) is one of the thermoplastic biodegradable plastics. As a copolymer of butanediol adipate ester and butylene terephthalate, PBAT has both the properties of poly butyl acrylate (PBA) and polybutylene terephthalate (PBT), such as good ductility and elongation at break, as well as good heat resistance and impact properties; in addition, PBAT also has excellent biodegradability and is one of the very preferred and marketable degradable materials in biodegradable plastics research. Polylactic acid (PLA), also known as polypropylene glycolide, is a polyester polymer obtained by polymerizing lactic acid as the main raw material. It is a new biodegradable material with excellent light transmission and good biodegradability, but poor toughness. The composite biodegradable mulching film prepared by copolymerization of PBAT and PLA provides an effective integration of the advantages of the two, and such composite mulching film has been reported in the prior art.

The existing biodegradable mulching films, however, are usually improved in terms of biodegradability, processing performance or mechanical properties. Therefore, most of the mulching films are universal films that fail to correspond to the environmental and regulatory needs in the reproductive period of crops, and the yields are often lower than those of polyethylene films. Although the ecological benefits are good, the economic benefits are not prominent, and it is difficult to be accepted by the farmers. For example, the functions needed in the early stage of potato include grass suppression, temperature increasing, moisture preservation, and the functions needed in the late stage include: air permeability, water preservation, temperature reduction, and bacteria suppression. For instance, peanut needs increased temperature and moisture in the early stage, and require reduced temperature and increased permeability in the late stage to regulate the growth of the crop; and then, in another example, saline crops require a combined function of grass suppression and bacteria suppression, salt suppression and growth promotion, highly blocking of water and vapor, and anti-dripping and water retention.

However, the existing biodegradable mulching films are of a single function, mostly only the function of heat preservation and moisture retention, which fail to meet the dynamic needs of different crops.

SUMMARY

In view of the problems, the present disclosure provides a multifunctional controllable multi-layer co-extruded biodegradable mulching film and a preparation method thereof, which has the function of heat preservation and moisture preservation and at the same time is capable of realizing the function of regulating the growth of crops by setting up a three-layer structure, and the functional layer thereof is capable of meeting the requirements of the growth of different crops through the fine-tuning of the raw materials and proportioning.

In order to achieve the above objectives, the present disclosure adopts the following technical schemes.

An aspect of the technical schemes provided by the present disclosure provides a multifunctional controllable multi-layer co-extruded biodegradable mulching film, sequentially including a skeleton layer, a functional layer and a controlled release layer from top to bottom according to a use direction; where the skeleton layer, the functional layer and the controlled release layer all take PBAT (poly (butylene adipate-co-terephthalate), a thermoplastic biodegradable plastic) and PLA (polylactic acid) as resin matrixes; where raw materials of the skeleton layer also include reinforcing and toughening master batches; raw materials of the functional layer also include functional master batches; and raw materials of the controlled release layer also include starch-based derivatives.

A thickness of the skeleton layer is $\frac{1}{3}$-$\frac{1}{2}$ of a total thickness of the mulching film; a thickness of the controlled release layer is $\frac{1}{6}$-$\frac{1}{3}$ of the total thickness of the mulching film, and a rest is the functional layer.

The multifunctional controllable multi-layer co-extruded biodegradable mulching film has a three-layered structure, where the skeleton layer is added with the reinforcing and toughening master batches, primarily serving to ensure the mechanical strength; the functional layer is added with nutrients needed by the crops, growth regulator components, insecticidal components and the like, so that the growth ability of crops may be regulated according to the needs of crops; and starch-based derivatives are added to the controlled release layer to provide good controlled release capability and facilitate the slow release of the active ingredients in the functional layer.

As a further improvement of the present disclosure, by mass fraction, the raw materials of the skeleton layer include PLA 8-15%, reinforcing and toughening master batches 1-6%, color master batches 0-1% and a rest of PBAT; the raw materials of the functional layer include PLA 11-19%, functional master batches 1-7%, color master batches 0-4% and a rest of PBAT; and the raw materials of the controlled release layer include PLA 4-17%, starch-based derivative master batches 5-18%, and a rest of PBAT; where the color master batches are black color master batches, and the mulching film is transparent when an addition amount of the color master batches is 0, and the mulching film appears black when the addition amount of the color master batches is not 0.

Further optionally, by mass fraction, the raw materials of the skeleton layer include PLA 8-15%, reinforcing and toughening master batches 1-6%, color master batches 0-1% and a rest of PBAT; the raw materials of the functional layer include PLA 11-19%, functional master batches 1-7%, color master batches 2-4% and a rest of PBAT; and the raw materials of the controlled release layer include PLA 4-17%, starch-based derivative master batches 5-18%, and a rest of PBAT. A biodegradable mulching film prepared from such raw material components is more suitable for saline and alkaline land use, with high water and gas barrier and strong capability of anti-dripping, so as to reduce the water vapor throughput and form moisture microcirculation in the film, and therefore achieve the objective of controlling salt with water. It not only solves the problem of "white pollution" of polyethylene film, but also regulates water to control salt, suppresses salt and promotes growth, thereby significantly increasing production and income, saving costs and improving efficiency.

As another improvement of the present disclosure, by mass fraction, the raw materials of the skeleton layer include PLA 8-16%, reinforcing and toughening master batches 2-6%, color master batches 0-2% and a rest of PBAT; the raw materials of the functional layer include PLA 6-14%, functional master batches 3-5%, color master batches 0-5%, and a rest of PBAT; the raw materials of the controlled release layer include PLA 5-12%, starch-based derivative master batches 5-16%, and a rest of PBAT; and the color master batches are black color master batches.

Further optionally, by mass fraction, the raw materials of the skeleton layer include 8-16% of PLA, 2-6% of reinforcing and toughening master batches, 1-2% of color master batches and a rest of PBAT; the raw materials of the functional layer include PLA 6-14%, functional master batches 3-5%, color master batches 1-5%, and a rest of PBAT; and the raw materials of the controlled release layer include PLA 5-12%, starch-based derivative master batches 5-16%, and a rest of PBAT. A biodegradable mulching film prepared from such raw material composition is more suitable for peanut planting, as it does not affect the downward penetration of fruit needles, and it will increase temperature and preserve moisture in the early stage, and cool down and increase seepage in the late stage, so as to ensure the environmental needs of peanut in the whole growing period, and facilitate the growth of peanut.

As another improvement of the present disclosure, by mass fraction, the raw materials of the skeleton layer include 12-17% PLA, 1-4% reinforcing and toughening master batches, 0-2% color master batches and a rest of PBAT; the raw materials of the functional layer include PLA 7-19%, functional master batches 2-6%, color master batches 0-5%, and a rest of PBAT; the raw materials of the controlled release layer include PLA 11-17%, starch-based derivative master batches 8-19%, and a rest of PBAT; and the color master batches are black color master batches.

Further optionally, by mass fraction, the raw materials of the skeleton layer include PLA 12-17%, reinforcing and toughening master batches 1-4%, color master batches 1-2% and a rest of PBAT; the raw materials of the functional layer include PLA 7-19%, functional master batches 2-6%, color master batches 1-5%, and a rest of PBAT; and the raw materials of the controlled release layer include PLA 11-17%, starch-based derivative master batches 8-19%, and a rest of PBAT. A biodegradable mulching film prepared from such raw material composition is more suitable for potato planting. The functions required by potato in the early stage are grass suppression, temperature increase and moisture preservation, and the functions required in the later stage are air permeability, water preservation, temperature reduction and fungus suppression. Existing biodegradable mulching films are single-functional, mostly only have the function of heat preservation and moisture retention, and fail to meet the dynamic needs of the potato environment. The biodegradable mulching film of this disclosure is a special controllable biodegradable mulching film for potato, it is capable of suppressing grass and bacteria and dynamically regulating the temperature and moisture, including increasing the temperature and moisture in the early stage, and lowering the temperature and increasing the permeability in the late stage, as well as regulating the growth of crops, etc., by doing so, not only the problem of "white pollution" of polyethylene mulching film is solved, but also the production and income are significantly increased, thus saving costs and increasing efficiency.

In a further improvement of the present disclosure, the controlled release layer further includes a coating layer thereon, and it should be noted that a thickness of the coating layer is not included in the total thickness, where raw materials of the coating layer include pesticides, insect repellents or plant growth regulators.

In a further improvement, a number of layers of the functional layer is 1-3.

In a further improvement, the functional master batches include at least one of bacteriostat, growth regulator, water-retaining agent, water vapor barrier agent, anti-dripping agent and warming agent.

In a further improvement of the present disclosure, the bacteriostat is capsaicin; the growth regulator is a *Paecilomyces variotii* extract; the water-retaining agent is of polyacrylamide type; the anti-dripping agent is KF65020 or KF65015; the water vapor barrier agent is a thermoplastic polyurethane elastomer; the warming agent is a hydrotalcite-like polymer; and the color master batches are preferably bio-based black master batches.

After the heat preservation agents are added, the increased temperature helps to promote the growth of the crops. The water-retaining agent and barrier agent are added to keep water in the soil, which improves crop water utilization efficiency on the one hand, and reduces water energy to control salt enrichment in the surface soil on the other hand. The growth regulator is added to promote the growth of crops, facilitate production and realize the improvement of production capacity in saline land. The utilization of plant-derived pesticides, insect repellents or plant growth regulator concentrates facilitates green control of pests, diseases and weeds and enhances crop growth regulation. The specific functional phases may be realized by adjusting the ratio of PBAT, PLA and starch-based derivatives according to the needs of the crop, with the degradation period becoming shorter when PBAT is lower and the latter two are higher. For example, for spring application on potatoes, the black color master batches, heat preservation agent and water-retaining agent of the mulching film may be selected at a higher ratio, while the controlled release period may be shorter, so as to enhance the permeability and precipitation infiltration in the late growth period of potatoes; and for the autumn potatoes, the effects are on the contrary, thus achieving higher thermal insulation and water retention in the later stages to compensate for the effects of falling temperatures and drought on the potato, thereby realizing the objective of increased production and income.

The mulching film of the present disclosure may be transparent or black. Among them, black is the preferred color. When the mulching film is transparent, the warming rate is slightly lower, and the promotion of increased crop production and income is mainly attributed to other factors. The mulching film is controllable in terms of color by adding bio-based black master batches, and since the bio-based black color master batches are degradable, the black mulching film suppresses grass and keeps warm in the early stage, and in the later stage, the black color degrades and is released into the soil through the controlled release layer, and the mulching film becomes light in color, and the heat preservation effect is reduced, which facilitates the water infiltration. Another aspect of the technical scheme of the present disclosure provides a preparation method of the multifunctional controllable multi-layer co-extruded biodegradable mulching film, including preparing with a twin-screw extruder, and including following steps:

mixing raw materials of each layer according to a mass ratio to prepare raw material master batches of each layer;

determining a number of barrels corresponding to each layer according to a number of processing layers required by each layer, and adding raw materials, followed by film lifting at a die orifice, blow molding, over-traction and winding to obtain the multifunctional controllable multi-layer co-extruded biodegradable mulching film.

A further improvement of the present disclosure also includes a step of preparing a coating layer, where the step of preparing the coating layer includes: coating the raw materials of the coating layer on a surface of the controlled release layer of the multifunctional controllable multi-layer co-extruded biodegradable mulching film, and a dosage of effective components of the raw materials of the coating layer is 0.05-0.75 gram per square meter ($g/m^2$).

The present disclosure has the following technical effects.

The mulching film prepared by the present disclosure includes a three-layered structure, namely a skeleton layer, a functional layer and a controlled release layer. The resin matrixes of the three film layers are the same, thereby increasing the bonding force between each other and avoiding the peeling phenomenon in the later use process. The reinforcing and toughening master batches are added to the skeleton layer, which improve the mechanical strength of the whole mulching film. The master batches of starch-based derivatives are added to the controlled release layer, and the porous structure of starch-based derivatives ensures the slow release of active ingredients in the functional layer and prolong its action duration. The functional master batches containing bacteriostat, growth regulator, water-retaining agent, water vapor barrier agent, anti-dripping agent or warming agent are added to the functional layer, which may be properly adjusted according to the growth characteristics of different crops to meet the varied growth needs.

Since the resin matrixes of the skeleton layer, the functional layer and the controlled release layer of the present disclosure are prepared by blending PBAT and PLA, the compatibility between PBAT and PLA is not very satisfactory, and the composites prepared by blending the two are prone to phase separation. Coupled with the fact that there are a number of other functional components in the layers of the present disclosure and that the three layers do not have the same structure, the risk of phase separation of the materials is also further increased. In order to improve this defect, the present disclosure formulates the three different structural layers of PBAT and PLA in an increasing and decreasing manner. Meanwhile, a twin-screw extruder is used to prepare the integral film by means of multi-layer co-extrusion, so as to ensure both the uniformity of thickness between the layers and the bonding force between the layers to avoid phase separation, thus improving the overall performance.

DETAILED DESCRIPTION OF THE EMBODIMENTS

A number of exemplary embodiments of the present disclosure will now be described in detail, and this detailed description should not be considered as a limitation of the present disclosure, but should be understood as a more detailed description of certain aspects, characteristics and embodiments of the present disclosure.

It should be understood that the terminology described in the present disclosure is only for describing specific embodiments and is not used to limit the present disclosure. In addition, for the numerical range in the present disclosure, it should be understood that each intermediate value between the upper limit and the lower limit of the range is also specifically disclosed. The intermediate value within any stated value or stated range and every smaller range between any other stated value or intermediate value within the stated range are also included in the present disclosure. The upper and lower limits of these smaller ranges can be independently included or excluded from the range.

Unless otherwise specified, all technical and scientific terms used herein have the same meaning as commonly understood by one of ordinary skill in the art to which this present disclosure relates. Although the present disclosure only describes the preferred methods and materials, any methods and materials similar or equivalent to those described herein can also be used in the practice or testing of the present disclosure. All documents mentioned in this specification are incorporated by reference to disclose and describe methods and/or materials related to the documents. In case of conflict with any incorporated document, the contents of this specification shall prevail.

It is obvious to those skilled in the art that many improvements and changes can be made to the specific embodiments of the present disclosure without departing from the scope or spirit of the present disclosure. Other embodiments will be apparent to the skilled person from the description of the present disclosure. The specification and embodiments of this application are only exemplary.

The terms "including", "comprising", "having" and "containing" used in this specification are all open terms, which means including but not limited to.

Unless otherwise specified, "room temperature" in the present disclosure is calculated as 25+/−2 degrees Celsius (° C.).

The present disclosure provides a multifunctional controllable multi-layer co-extruded biodegradable mulching film, which sequentially includes a skeleton layer, a functional layer and a controlled release layer from top to bottom according to a use direction (that is, the controlled release layer is ensured to be on a ground side when in use); the skeleton layer, the functional layer and the controlled release layer all take PBAT (poly(butylene adipate-co-terephthalate), a thermoplastic biodegradable plastic) and PLA (polylactic acid) as resin matrixes, where raw materials of the skeleton layer also include reinforcing and toughening master batches, raw materials of the functional layer also include functional master batches, and raw materials of the controlled release layer also include starch-based derivatives.

A thickness of the skeleton layer is $1/3$-$1/2$ of a total thickness of the mulching film, a thickness of the controlled release layer is $1/6$-$1/3$ of the total thickness of the mulching film, and a rest is the functional layer.

The multifunctional controllable multi-layer co-extruded biodegradable mulching film has a three-layered structure; among them, the reinforcing and toughening master batches are added in the skeleton layer, which mainly plays a role of ensuring the mechanical strength, and functional master batches containing nutrients, growth regulators, insecticidal components and the like required by crops are added in the functional layer, so that the growth ability of crops may be regulated and controlled according to the needs of crops; starch-based derivatives are added to the controlled release layer, which enables a good controlled release capability and is convenient for the slow release of active ingredients in functional components.

In some embodiments of the present disclosure, by mass fraction, the raw materials of the skeleton layer include PLA 8-15%, reinforcing and toughening master batches 1-6%, color master batches 0-1% and a rest of PBAT; the raw materials of the functional layer include PLA 11-19%, functional master batches 1-7%, color master batches 0-4% and a rest of PBAT; the raw materials of the controlled release layer include PLA 4-17%, starch-based derivative master batches 5-18%, and a rest of PBAT; where the color master batches are black color master batches. When the addition amount of color master batches is 0, the mulching film is transparent, and when the addition amount of color master batches is not 0, the mulching film appears black.

In a further preferred embodiment, by mass fraction, the skeleton layer includes 8-15% of PLA, 1-6% of reinforcing and toughening master batches, 0-1% of color master batches and not 0, and a rest of PBAT; the raw materials of the functional layer include PLA 11-19%, functional master batches 1-7%, color master batches 2-4%, and a rest of PBAT; the raw materials of the controlled release layer include PLA 4-17%, starch-based derivative master batches 5-18%, and a rest of PBAT. The biodegradable mulching film prepared from such raw material components is more suitable for saline-alkali land, with high water vapor barrier and strong anti-dripping property, thus reducing the amount of water and gas through the formation of microcirculation of water in the film, and achieving the objective of salt control by water. By doing so, not only the problems of "white pollution" caused by polyethylene film are solved, but also the water control and salt control, salt suppression and promotion of growth are realized, significantly increasing the production and income, and saving costs and increasing the efficiency. The composition of the raw materials in the present embodiment is more suitable for saline crop cultivation, and a good effect of increasing production and income is realized within these ranges. However, they are not listed individually, and only one is provided as an example in the following embodiments.

In other embodiments of the present disclosure, by mass fraction, the raw materials of the skeleton layer include PLA 8-16%, reinforcing and toughening master batches 2-6%, color master batches 0-2%, and a rest of PBAT; the raw materials of the functional layer include PLA 6-14%, functional master batches 3-5%, color master batches 0-5%, and a rest is PBAT; the raw materials of the controlled release layer include PLA 5-12%, starch-based derivative master batches 5-16%, and a rest is PBAT; the color master batches are black color master batches.

More optionally, by mass fraction, the skeleton layer includes 8-16% of PLA, 2-6% of reinforcing and toughening master batches, 1-2% of color master batches and a rest of PBAT; the functional layer includes 6-14% of PLA, 3-5% of functional master batches, 1-5% of color master batches and a rest of PBAT; the raw materials of the controlled release layer includes PLA 5-12%, starch-based derivative master batches 5-16%, and a rest of PBAT. The biodegradable mulching film prepared from such raw materials is more suitable for peanut planting as it does not affect the downward pricking of fruit needles, increases the temperature and moisture in the early stage, and cools down the temperature and increases the seepage in the later stage to ensure the environmental needs of peanuts in the whole growing period. The composition of raw materials in the above embodiments is more suitable for peanut cultivation, and a good effect of increasing production and income may be realized within these ranges. However, they are not listed one by one, and only one is provided as an example in the following embodiments.

In other embodiments of the present disclosure, by mass fraction, the raw materials of the skeleton layer include PLA 12-17%, reinforcing and toughening master batches 1-4%, color master batches 0-2% and a rest of PBAT; the raw materials of the functional layer include PLA 7-19%, functional master batches 2-6%, color master batches 0-5%, and a rest of PBAT; the raw materials of the controlled release layer include PLA 11-17%, starch-based derivative master batches 8-19%, and a rest is PBAT; and the color master batches are black color master batches. Further optionally, by mass fraction, the skeleton layer includes 12-17% of PLA, 1-4% of reinforcing and toughening master batches, 1-2% of color master batches and a rest of PBAT; the functional layer includes 7-19% of PLA, 2-6% of functional master batches, 1-5% of color master batches and a rest of PBAT; the raw materials of the controlled release layer include PLA 11-17%, starch-based derivative master batches 8-19%, and a rest is PBAT. The biodegradable mulching film prepared from such raw material composition is more suitable for potato planting. The functions required by potato in the early stage are grass suppression, temperature increase and moisture preservation, and the functions required in the later stage are air permeability, water preservation, temperature reduction and fungus suppression. Existing biodegradable mulching films are single-functional, mostly only have the function of heat preservation and moisture retention, and fail to meet the dynamic needs of the potato environment. The biodegradable mulching film of this disclosure is a special controllable biodegradable mulching film for potato, it is capable of suppressing grass and bacteria and dynamically regulating the temperature and moisture, including increasing the temperature and moisture in the early stage, and lowering the temperature and increasing the permeability in the late stage, as well as regulating the growth of crops, etc., by doing so, not only the problem of "white pollution" of polyethylene mulching film is solved, but also significantly increase production and income, saving costs and increasing efficiency. The composition of the raw materials in the above embodiments is more suitable for potato crop cultivation, and a good effect of increasing production and income may be achieved within these ranges. However, they are not listed one by one, and only one is provided as an example in the following embodiments.

In some preferred embodiments of the present disclosure, the controlled release layer further includes a coating layer, and it should be noted that a thickness of the coating layer is not included in the total thickness; among them, raw materials of the coating layer include pesticides, insect repellents or plant growth regulators.

In some preferred embodiments of the present disclosure, a number of layers of the functional layer is 1-3, and each layer has a same thickness. However, the active ingredients added in the functional layer master batches may be different.

In some preferred embodiments of the present disclosure, the functional master batches include at least one active ingredient selected from bacteriostat, growth regulator, water-retaining agent, water vapor barrier agent, anti-dripping agent and warming agent. A specific preparation method includes adding active ingredients to a resin matrix in a molten state, followed by granulation using conventional techniques. In some preferred embodiments, a content of the active ingredients in the functional layer is 0.1-0.2%.

In some preferred embodiments of the present disclosure, the bacteriostat is capsaicin; the growth regulator is *Paecilomyces variotii* extract; the water-retaining agent is of polyacrylamide type; the anti-dripping agent is KF65020 or KF65015; the water vapor barrier agent is a thermoplastic polyurethane elastomer; the warming agent is a hydrotalcite-like polymer; the color master batches are preferably bio-based black master batches.

The present disclosure provides a preparation method of the multifunctional controllable multi-layer co-extruded biodegradable mulching film, including using a twin-screw extruder for preparation, and including the following steps:

(1) preparation of resin of each layer: the materials in the formula are mixed according to a ratio, and then fed into the twin-screw extruder by a feeder, and then drawn, air-cooled, conveyed and pelletized to produce the resin of the corresponding layer of the biodegradable mulching film; (2) according to a number of layers to be processed, a corresponding multi-layer co-extrusion blow molding unit is selected, and the skeleton layer, the functional layer, and the controlled release layer of the mulching film are placed in the corresponding 3 to 5 barrels, followed by lifting the film through the die orifice, blow molding, over-traction and winding to produce the multifunctional controllable multi-layer co-extruded biodegradable mulching film; (3) when adding a coating layer, the blown film is directly coated with a plant-derived pesticide, insect repellent or plant growth regulator concentrate required by the crop, with an active ingredient dosage of 0.05-0.75 g/m².

It should be noted that in the above preparation method, the technological processes such as drawing, air cooling, conveying, granulating, film lifting, blow molding, over-traction, winding, etc. are all routine operations well known to those skilled in the art, and are not the main points of the present disclosure, so they will not be repeated here.

In the following embodiments, all raw materials are obtained by commercial purchase, and the source of purchase is not limited.

In the following embodiments, the bacteriostat is capsaicin; the growth regulator is *Paecilomyces variotii* extract; the water-retaining agent is polyacrylamide water-retaining agent; the anti-dripping agent is KF65020; the water vapor barrier agent is thermoplastic polyurethane elastomer; the warming agent is hydrotalcite-like polymer; the color master batches are preferably bio-based black master batches; the reinforcing and toughening master batches are preferably the toughening master batch eSunBio5821E. The plant-derived pesticide is matrine; and the insect repellent is avermectin.

The preparation method of the starch-based derivative is referred to the Chinese patent CN110272566A (Preparation Method of Starch-based Derivative Modified Polyethylene Mulching Film), and the specific method is as follows:

(1) completely soaking corn starch in absolute ethanol at 0° C. for 30 minutes (min), then filtering and drying to a constant weight;
(2) adding the starch after the above treatment to dichloromethane in a ratio of 50 g:300 mL and stirring at 300 revolutions per minute (r/min) for 30 min to obtain a dichloromethane mixed slurry;
(3) adding triethylamine with starch mass of 6% to the dichloromethane mixed slurry obtained above, and continuing to stir for 10 min, then slowly dropping dichloromethane solution of 2-chloroethyl dichlorophosphoric acid with mass of 20% to the dichloromethane mixed slurry, then heating to 60° C., stirring at a rotating speed of 500 r/min for 5 hours (h), holding and standing for 1 h, then filtering to obtain reactants, and adding the reactants into sodium carbonate/sodium bicarbonate buffer solution for soaking for 20 min; then filtering again, washing with ethanol solution and deionized water in turn, and vacuum drying to a constant weight to obtain the starch-based derivative.

Embodiment 1

A multifunctional controllable multi-layer co-extruded biodegradable mulching film, including a skeleton layer, a functional layer and a controlled release layer from top to bottom (according to a use direction); the skeleton layer includes PBAT, PLA and reinforcing and toughening master batches; the functional layer includes PBAT, PLA, functional master batches and color master batches; the controlled release layer includes PBAT, PLA and starch-based derivatives; the skeleton layer, the functional layer and the controlled release layer of the mulching film are respectively made of corresponding biodegradable resin;

in the mulching film, a thickness of the skeleton layer accounts for ⅓ of the total thickness of the mulching film, and the biodegradable resin is made of the following raw materials in percentage by mass: PBAT 85%, PLA 12%, reinforcing and toughening master batches 2% and color master batches 1%;

a thickness of the functional layer of the mulching film accounts for ⅓ of the total thickness of the mulching film, and the biodegradable resin is made of the following raw materials in percentage by mass: PBAT 83%, PLA 11%, functional master batches 4% and color master batches 2%. The functional layer is of three layers, each layer has the same thickness, and the difference in raw material composition lies only in the difference in active ingredients. Specifically, the three layers are respectively added with bacteriostat and growth regulator (adjacent to the controlled release layer), water-retaining agent and water vapor barrier agent, anti-dripping agent and warming agent (adjacent to the skeleton layer), where all the active ingredients are added in equal amount, and the total content of active ingredients is 1% of the total mass of the functional layer of the mulching film.

The thickness of the controlled release layer of the mulching film accounts for ⅓ of the total thickness of the mulching film, and the biodegradable resin includes the following raw materials in percentage by mass: PBAT 65%, PLA 17%, and starch-based derivative master batches 18%.

The mulching film is prepared by a twin-screw extruder, and the preparation method includes the following steps:

(1) preparation of resins of each layer: the materials in the formula are mixed according to a ratio, and then fed into a twin-screw extruder by a feeder, and then drawn, air-cooled, conveyed and pelletized to produce the resin of the corresponding layer of the biodegradable mulching film; (2) according to the number of layers to be processed, a corresponding multi-layer co-extrusion blow molding unit is selected, and the skeleton layer, the functional layer, and the controlled release layer of the mulching film are placed in the corresponding 5 barrels, followed by lifting the film through the die orifice, blow molding, over-traction and winding to produce multifunctional controllable multi-layer co-extruded biodegradable mulching film; (3) when adding a coating layer, the extruded film is directly coated with a diluent of insect repellent, with an active ingredient dosage of 0.05-0.75 g/m², followed by naturally drying.

The mulching film prepared by this embodiment is used for planting triticale in saline-alkali land.

Test group 1: biodegradable mulching film of this embodiment.

Test group 2: the addition of color master batches is omitted on the basis of Test group 1, namely, the addition amount of color master batches in each layer is 0, and the transparent mulching film is prepared.

Control group 1: the mulching film as a whole is prepared using the raw material ratios of the skeleton layer, and the obtained mulching film is a single-layer structure, and the coating layer and the thickness of the mulching film are the same as that of Embodiment 1.

Control group 2: the membrane is a double-layered structure, including only the skeleton layer and the functional layer, with the preparation of the controlled release layer omitted, and the thickness of the functional layer is unchanged, the total thickness of the mulching film is the same as the thickness of the mulching film of Embodiment 1, and the coating layer is the same as that of Embodiment 1.

Control group 3: no coating layer.

Control group 4: the difference from Embodiment 1 is only in the compositions of the skeleton layer and the functional layer, which are as follows:

the thickness of the skeleton layer of the mulching film accounts for 1/3 of the total thickness of the mulching film, and the biodegradable resin is made of the following raw materials in percentage by mass: PBAT 85%, PLA 12%, reinforcing and toughening master batches 1% and color master batches 2%;

the thickness of the functional layer of the mulching film accounts for 1/3 of the total thickness of the mulching film, and the biodegradable resin is made of the following raw materials in percentage by mass: PBAT 83%, PLA 11%, functional master batches 1.5% and color master batches 4.5%; the functional layer is of three layers, each layer has the same thickness, and the difference in raw material composition lies only in the difference in active ingredients; specifically, the three layers are respectively added with bacteriostat and growth regulator (adjacent to the controlled release layer), water-retaining agent and water vapor barrier agent, anti-dripping agent and warming agent (adjacent to the skeleton layer), where all the active ingredients are added in equal amount, and the total content of active ingredients is 1% of the total mass of the functional layer of the mulching film.

Blank control group: no mulching film is used.

Test plots: the saline land used for the experiment has a salt content of 4.5% c, which is moderate salinization land. Five equal-sized test areas are selected, and the planting density, planting method, and management method of each test area are the same as the conventional planting method. The use method of mulching film is consistent with that of conventional mulching film.

The results of the yield enhancement effect of the various groups of triticale are shown in Table 1.

TABLE 1

| | Test group 1 | Test group 2 | Control group 1 | Control group 2 | Control group 3 | Control group 4 | Blank control group |
|---|---|---|---|---|---|---|---|
| Color of mulching film | Black | Transparent | Black | Black | Black | Black | / |
| Seedling establishment rate, % | 96% | 93% | 90% | 86% | 91% | 93.5% | 83% |
| Weeding rate | 95% | Herbicide spraying required | Herbicide spraying required | Herbicide spraying required | Herbicide spraying required | Herbicide spraying required | Herbicide spraying required |
| Disease and insect pests | Extremely low | Low | Relatively low | Relatively low | Medium | Low | High |
| Yield increment per 666.67 m$^2$, % | 76.2% | 79.3% | 51.9% | 59.8% | 65.9% | 63.3% | / |

Note: the calculation method of yield increment per mu: (actual yield-yield of blank control group)/yield of blank control group×100%.

Because the seedling establishment rate and the number of grains per panicle of Test groups 1-2 are higher than those of the four control groups, the yield per 666.67 m$^2$ is higher than that of the four control groups, especially significantly higher than that of the blank control group.

There is no significant difference between the seedling establishment rate of Control group 2 and Control group 1, but the total yield is much higher than that of Control group 1. The possible reason is that the addition of active ingredients in the functional layer has a positive effect on preventing diseases and pests and promoting the growth of triticale. In addition, Test group 1 shows better performance than Test group 2, with a yield equivalent to that of Test group 2 without using herbicides. As the black mulching film is gradually degraded over time during the growing period of crops, the black color master batches are decomposed during the process of mulching film degradation, so that the color of the mulching film gradually becomes lighter, and the light transmittance is gradually strengthened. At the early stage, the black color of the mulching film is darker, which suppresses grass and keeps warm, and in the later stage, the black color degrades and is released into the soil through the controlled release layer, which makes the mulching film lighter, which reduces the effect of heat preservation and facilitates water infiltration, and thus improves the growth performance of the crop and the resistance to diseases. However, the total yield of Control group 2 is lower than that of the test groups, which may be attributed to the introduction of the controlled release layer in the test groups, which has a positive effect on prolonging the action time of the active ingredients. In control group 3, the coating layer is omitted, the seedling establishment rate is not significantly different from that of the test groups, and the total yield is only slightly lower than that of the test groups, which indicates that the coating layer has a positive effect on yield improvement, but the effect is not significant.

The addition amount of color master batches in the functional layer and skeleton layer of Control group 4 is higher than that in Embodiment 1. Although there is no significant difference between the plant diseases and insect pests and the seedling establishment rate of Control group 4 and the Test groups, the final yield increment per 666.67 $m^2$ is significantly lower than that of the Test groups. The possible reason is that the increase of black color master batches deepens the color of the mulching film, as black absorbs light more, making the internal crop temperature environment is always higher, even with the subsequent release of the controlled release layer degradation, the insulation performance is also higher than that of the test groups, which is not conducive to lowering the soil temperature and increasing the infiltration of water, and the high temperature and high humidity environment results in the nutrient accumulation of small rye slower, which ultimately leads to a lower yield per 666.67 $m^2$ than that of the test groups, but the yield is still significantly higher than that of Control group 1 (which is the current commercially available biodegradable mulching film), and the effect of pest and disease control is better than that of the Control group 3.

Embodiment 2

The present disclosure relates to a special multifunctional controllable multi-layer co-extruded biodegradable mulching film for peanuts, including a skeleton layer, a functional layer and a controlled release layer from top to bottom; where the skeleton layer includes PBAT, PLA and reinforcing and toughening master batches; the functional layer includes PBAT, PLA, functional master batches and color master batches; the controlled release layer includes PBAT, PLA and starch-based derivatives;

the skeleton layer, the functional layer and the controlled release layer of the mulching film are respectively made of corresponding biodegradable resin;

the thickness of the skeleton layer of the mulching film accounts for ⅓ of the total thickness of the mulching film, and the biodegradable resin is made of the following raw materials in percentage by mass: PBAT 86%, PLA 8%, reinforcing and toughening master batches 5% and color master batches 1%;

the thickness of the functional layer of the mulching film accounts for ⅓ of the total thickness of the mulching film, and the biodegradable resin is made of the following raw materials in percentage by mass: PBAT 82%, PLA 12%, functional master batches 5% and color master batches 1%;

the thickness of the controlled release layer of the mulching film accounts for ⅓ of the total thickness of the mulching film, and the biodegradable resin is made of the following raw materials in percentage by mass: PBAT 78%, PLA 12%, and starch-based derivative master batches 10%; and the functional master batches include herbicide, bacteriostat, growth regulator, water-retaining agent and warming agent with equal mass; the total content of active ingredients is 1% of the total mass of the functional layer of mulching film.

The mulching film of this embodiment is prepared by using a twin-screw extruder, and the specific method includes the following steps:

(1) preparation of resin of each layer: the materials in the formula are mixed according to a ratio, and then fed into a twin-screw extruder by a feeder, and then drawn, air-cooled, conveyed and pelletized to produce the resin of the corresponding layer of the biodegradable mulching film; (2) according to the number of layers to be processed, a corresponding multi-layer co-extrusion blow molding unit is selected, and the skeleton layer, the functional layer, and the controlled release layer of the mulching film are placed in the corresponding 3 barrels, followed by lifting the film through the die orifice, blow molding, over-traction and winding to produce multifunctional controllable multi-layer co-extruded biodegradable mulching film; (3) when adding a coating layer, the blown film is directly coated with a plant-derived pesticide, insect repellent or plant growth regulator concentrate required by the crop, with an active ingredient dosage of 0.60 $g/m^2$ (three effective components are added in equal amount).

The mulching film prepared in this embodiment is used for peanut planting experiment.

Test group 1: biodegradable mulching film of this embodiment.

Test group 2: the addition of color master batches is omitted on the basis of Test group 1, that is, the addition amount of color master batches is 0, and the transparent mulching film is prepared.

Control group 1: the mulching film as a whole is prepared using the raw material ratios of the skeleton layer, and the obtained mulching film is a single-layer structure, and the coating layer and the thickness of the mulching film are the same as that of Embodiment 2.

Blank control group: no mulching film is used.

Three equal-sized test areas are selected, and the planting density, planting method, and management method of each test area are the same as the conventional planting method. The use method of mulching film is consistent with that of conventional mulching film.

The results of the yield enhancement effect of the various groups of peanut are shown in Table 2.

TABLE 2

|  | Test group 1 | Control group 1 | Test group 2 | Blank control group |
|---|---|---|---|---|
| Color of mulching film | Black | Black | Transparent | / |
| Weeding rate | 94% | Herbicide spraying required | Herbicide spraying required | Herbicide spraying required |
| Seedling establishment rate, % | 96% | 91% | 92% | 69% |
| Underground pest occurrence | Extremely low | Low | Low | Relatively high |
| Yield increment per 666.67 $m^2$, % | 69.2% | 51.9% | 67.5% |  |

Note: calculation method of yield increment per 666.67 $m^2$: (actual yield-yield of blank control group)/yield of blank control group×100%.

The mulching film of Test group 1 is a black mulching film, and the mulching film prepared by Test group 2 is a transparent mulching film. The seedling establishment rate, disease degree and yield per 666.67 $m^2$ of experimental area using mulching film of Test group 2 are higher than those of Control group 1 and Blank control group, but slightly lower than those of Test group 1. The reason may be that at the early stage of using the mulching film, the warming rate of the black mulching film is higher than that of the transparent mulching film, and the black mulching film of Test group 1 gradually degrades with time during the growth period of peanuts, and the black master batches decomposes during the process of the mulching film degradation, so that the color of the mulching film gradually becomes lighter, and the transmittance of the light is gradually strengthened. In the early stage, the black mulching film suppresses grass and heat preservation, and in the late stage, the black color is degraded and released into the soil through the controlled release layer, the film becomes lighter, the heat preservation effect is reduced, which is conducive to the infiltration of water, thus improving the growth performance of peanuts and disease resistance. Obviously, the color of the film layers also has a positive effect on the improvement of peanut yield.

Embodiment 3

The present disclosure relates to a special multifunctional controllable multi-layer co-extruded biodegradable mulching film for potatoes, including a skeleton layer, a functional layer and a controlled release layer from top to bottom; where the skeleton layer includes PBAT, PLA and reinforcing and toughening master batches; the functional layer includes PBAT, PLA, functional master batches and color master batches; the controlled release layer includes PBAT, PLA and starch-based derivatives;

the skeleton layer, the functional layer and the controlled release layer of the mulching film are respectively made of corresponding biodegradable resin;

the thickness of the skeleton layer of the mulching film accounts for ½ of the total thickness of the mulching film, and the biodegradable resin is made of the following raw materials in percentage by mass: PBAT 80%, PLA 15%, reinforcing and toughening master batches 4% and color master batches 1%;

the thickness of the functional layer of the mulching film accounts for ⅙ of the total thickness of the mulching film, and the biodegradable resin is made of the following raw materials in percentage by mass: PBAT 75%, PLA 19%, functional master batches 5% and color master batches 1%;

the thickness of the controlled release layer of the mulching film accounts for ⅙ of the total thickness of the mulching film, and the biodegradable resin is made of the following raw materials in percentage by mass: PBAT 69%, PLA 15%, and starch-based derivative master batches 16%;

the functional layer is of three layers, each layer has the same thickness, and the difference in raw material composition lies only in the difference in active ingredients. Specifically, the three layers are respectively added with bacteriostat and growth regulator (adjacent to the controlled release layer), water-retaining agent and water vapor barrier agent, anti-dripping agent and warming agent (adjacent to the skeleton layer), where all the active ingredients are added in equal amount, and the total content of active ingredients is 1% of the total mass of the functional layer of the mulching film.

The preparation method is as follows:

(1) preparation of resins of each layer: the materials in the formula are mixed according to a ratio, and then fed into a twin-screw extruder by a feeder, and then drawn, air-cooled, conveyed and pelletized to produce the resin of the corresponding layer of the biodegradable mulching film; (2) according to the number of layers to be processed, a corresponding multi-layer co-extrusion blow molding unit is selected, and the skeleton layer, the functional layer, and the controlled release layer of the mulching film are placed in the corresponding 5 barrels, followed by lifting the film through the die orifice, blow molding, over-traction and winding to produce multifunctional controllable multi-layer co-extruded biodegradable mulching film; (3) when adding a coating layer, the blownfilm is directly coated with a plant-derived pesticide, insect repellent and plant growth regulator concentrate, with an active ingredient dosage of 0.66 g/m$^2$ (three effective components are added in equal amount).

The mulching film prepared in this embodiment is used for peanut planting experiment.

Test group 1: biodegradable mulching film of this embodiment.

Test group 2: the addition of color master batches is omitted on the basis of Test group 1, and the transparent mulching film is prepared.

Control group 1: the whole mulching film is prepared by the raw material ratio of skeleton layer, and the obtained mulching film has a single-layer structure, and the thickness of coating layer and mulching film is the same as that of Embodiment 3.

Blank control group: no mulching film is used.

Three test areas with the same size are selected, and the planting density, planting methods and management methods in each test area were the same as those in conventional planting methods. The use method of mulching film is consistent with that of conventional mulching film.

The results of the yield enhancement effect of the various groups of potato are shown in Table 3.

TABLE 3

| | Test group 1 | Test group 2 | Control group 1 | Black control group |
|---|---|---|---|---|
| Color of mulching film | Black | Transparent | Black | / |
| Weeding rate | 96% | Herbicide spraying required | Herbicide spraying required | Herbicide spraying required |
| Seedling establishment rate, % | 97% | 92% | 90% | 67% |
| Potato diseases | Extremely low | Low | Relatively low | Relatively high |
| Yield increment per 666.67 m$^2$, % | 78.7% | 72.64% | 53.4% | / |

Note: calculation method of yield increment per 666.67 m$^2$: (actual yield-yield of blank control group)/yield of blank control group×100%.

As can be seen from Table 3, the yield per 666.67 m$^2$ of both Test group 1 and Test group 2 is significantly higher than that of Control group 1 and Blank control group, and the resistance to pests and diseases and seedling establishment rate are also significantly higher than that of Control group 1 and Blank control group, indicating that the effect of mulching film of Test groups 1-2 is significant for increasing the yield of potato and increasing the income; the probable reason for this is that the introduction of the controlled release layer in the test group is positively contributing to the prolongation of the active ingredients' duration of action; and the coating layer is positively contributing to the increase in yield; in addition, the effect of Test group 1 is the best, the reason is that the black mulching film in the growing period of crops, with the progress of time, gradually decomposes, and the black color master batches are also decomposed during the process of mulching film degradation, so that the color of the mulching film becomes lighter gradually, and the light transmittance is strengthened gradually. In the early stage, the black color of the film is darker, which suppresses grass and keeps the heat, and in the later stage, the black color degrades and is released into the soil through the controlled release layer, the film becomes lighter, the heat preservation effect is reduced, and it is beneficial to the water infiltration, thereby improving the growth performance of the crop and the resistance to the disease.

Comparative Embodiment 1

A multifunctional controllable multi-layer co-extruded biodegradable mulching film, including a skeleton layer, a functional layer and a controlled release layer from top to bottom (according to the use direction); the skeleton layer includes PBAT, PLA and reinforcing and toughening master batches; the functional layer includes PBAT, PLA, functional master batches and color master batches; the controlled release layer includes PBAT, PLA and starch-based derivatives; the skeleton layer, the functional layer and the controlled release layer of the mulching film are respectively made of corresponding biodegradable resin;

the thickness of the skeleton layer of the mulching film accounts for ⅓ of the total thickness of the mulching film, and the biodegradable resin is made of the following raw materials in percentage by mass: PBAT 85%, PLA 12%, reinforcing and toughening master batches 2% and color master batches 1%;

the thickness of the functional layer of the mulching film accounts for ⅓ of the total thickness of the mulching film, and the biodegradable resin is made of the following raw materials in percentage by mass: PBAT 65%, PLA 17%, functional master batches 6% and color master batches 2%; the functional layer is of three layers, with each layer having the same thickness, and the difference in raw material composition lies only in the difference in active ingredients. Specifically, the three layers are respectively added with bacteriostat and growth regulator (adjacent to the controlled release layer), water-retaining agent and water vapor barrier agent, anti-dripping agent and warming agent (adjacent to the skeleton layer), where all the active ingredients are added in equal amount, and the total content of active ingredients is 1% of the total mass of the functional layer of the mulching film.

The thickness of the controlled release layer of the mulching film accounts for ⅓ of the total thickness of the mulching film, and the biodegradable resin is made of the following raw materials in percentage by mass: PBAT 83%, PLA 11%, and starch-based derivative master batches 16%.

The preparation method of mulching film is the same as in Embodiment 1.

Comparative Embodiment 2

A multifunctional controllable multi-layer co-extruded biodegradable mulching film, including a skeleton layer, a functional layer and a controlled release layer from top to bottom (according to the use direction); the skeleton layer includes PBAT, PLA and reinforcing and toughening master batches; the functional layer includes PBAT, PLA, functional master batches and color master batches; the controlled release layer includes PBAT, PLA and starch-based derivatives; the skeleton layer, the functional layer and the controlled release layer of the mulching film are respectively made of corresponding biodegradable resin;

the thickness of the skeleton layer of the mulching film accounts for ⅓ of the total thickness of the mulching film, and the biodegradable resin is made of the following raw materials in percentage by mass: PBAT 83%, PLA 10.5%, reinforcing and toughening master batches 5.5% and color master batches 1%;

the thickness of the functional layer of the mulching film accounts for ⅓ of the total thickness of the mulching film, and the biodegradable resin is made of the following raw materials in percentage by mass: PBAT 83%, PLA 10.5%, functional master batches 4.5% and color master batches 2%. The functional layer is of three layers, with each layer having the same thickness, and the difference in raw material composition lies only in the difference in active ingredients. Specifically, the three layers are respectively added with bacteriostat and growth regulator (adjacent to the controlled release layer), water-retaining agent and water vapor barrier agent, anti-dripping agent and warming agent (adjacent to the skeleton layer), where all the active ingredients are added in equal amount, and the total content of active ingredients is 1% of the total mass of the functional layer of the mulching film.

The thickness of the controlled release layer of the mulching film accounts for ⅓ of the total thickness of the mulching film, and the biodegradable resin is made of the following raw materials in percentage by mass: PBAT 83%, PLA 10.5%, and starch-based derivative master batches 6.5%.

The preparation method of the mulching film is the same as in Embodiment 1.

The mechanical properties of biological mulching films prepared in Embodiment 1 and Comparative embodiments 1-2 are tested, and the test results are shown in Table 4.

TABLE 4

|  | Embodiment 1 (Test group 1) | Comparative embodiment 1 | Comparative embodiment 2 |
|---|---|---|---|
| Transverse tensile strength/MPa | 49.3 | 36.2 | 39.9 |
| Transverse elongation at break/% | 596 | 369 | 412 |
| Oxygen transmission coefficient/ $10^{-14}$g · cm/ (cm$^2$ · S · Pa) | 5.71 | 5.64 | 4.13 |
| Water vapor transmission coefficient/ $10^{-14}$g · cm/ (cm$^2$ · S · Pa) | 7.91 | 7.36 | 6.13 |

Note: the transverse tensile strength and elongation at break are determined according to the Chinese national standard GB/T 1040-1992, and the tensile speed is 20 mm/min.

The oxygen permeability is tested by gas permeameter, and the test gas is high purity oxygen, with constant temperature of 23° C. and humidity of 0; the water vapor permeability refers to GB/T16928, the relative humidity (RH) is 90%, and the temperature is 38° C.

The composition of the resin matrix of Comparative embodiment 1 is not mixed in an increasing or decreasing way, and the resin matrix of Comparative embodiment 2 is formulated using the ratio of the functional layer. The tensile strength and elongation at break of the mulching film of Embodiment 1 are better than those of Comparative embodiment 1 and Comparative embodiment 2, and it is therefore evident that the mechanical properties of the mulching film are effectively improved by adopting the proportioning method of Embodiment 1. In contrast, the oxygen permeability coefficient and water vapor permeability coefficient of the mulching film of Embodiment 1 are better than those of Comparative embodiment 1 and Comparative embodiment 2, which may be due to the reduction in the amount of the starch-based derivative master batches.

The above describes only the preferred embodiments of the present disclosure, but the protection scope of the present disclosure is not limited to this, and any changes or substitutions that can be easily thought of by those familiar with the technical field within the technical scope disclosed by the present disclosure should be included in the protection scope of the present disclosure. Therefore, the scope of protection of the present disclosure should be based on the scope of protection of the claims.

What is claimed is:

1. A multifunctional controllable multi-layer co-extruded biodegradable mulching film, comprising a skeleton layer, a functional layer and a controlled release layer from top to bottom according to a use direction; wherein the skeleton layer, the functional layer and the controlled release layer all take PBAT and PLA as resin matrixes; wherein raw materials of the skeleton layer also comprise reinforcing and toughening master batches, raw materials of the functional layer also comprise functional master batches, and raw materials of the controlled release layer also comprise starch-based derivatives;

a thickness of the skeleton layer is ⅓-½ of a total thickness of the mulching film; a thickness of the controlled release layer is ⅙-⅓ of the total thickness of the mulching film, and a rest is the functional layer;

contents of the PBAT in the skeleton layer, the functional layer and the controlled release layer are decreasing;

both the skeleton layer and the functional layer comprise color master batches, and the color master batches are bio-based black master batches; and a content of the color master batches in the skeleton layer is 0-1%, and a content of the color master batches in the functional layer is 0-4%.

2. The multifunctional controllable multi-layer co-extruded biodegradable mulching film according to claim 1, wherein by mass fraction, the raw materials of the skeleton layer comprise PLA 8-15%, reinforcing and toughening master batches 1-6%, and a rest of PBAT; the raw materials of the functional layer comprise PLA 11-19%, functional master batches 1-7%, and a rest of PBAT; the raw materials of the controlled release layer comprise PLA 4-17%, starch-based derivative master batches 5-18%, and a rest of PBAT.

3. The multifunctional controllable multi-layer co-extruded biodegradable mulching film according to claim 1, wherein the controlled release layer further comprises a coating layer; wherein raw materials of the coating layer comprise pesticides, insect repellents or plant growth regulators.

4. The multifunctional controllable multi-layer co-extruded biodegradable mulching film according to claim 1, wherein a number of layers of the functional layer is 1-3.

5. The multifunctional controllable multi-layer co-extruded biodegradable mulching film according to claim 1, wherein the functional master batches comprise at least one of bacteriostat, growth regulator, water-retaining agent, water vapor barrier agent, anti-dripping agent and warming agent.

6. The multifunctional controllable multi-layer co-extruded biodegradable mulching film according to claim 5, wherein the bacteriostat is capsaicin; the growth regulator is *Paecilomyces variotii* extract; the water-retaining agent is polyacrylamide; the anti-dripping agent is KF65020 or KF65015; the water vapor barrier agent is a thermoplastic polyurethane elastomer; and the warming agent is a hydrotalcite-like polymer.

7. A preparation method of the multifunctional controllable multi-layer co-extruded biodegradable mulching film according to claim 1, comprising preparing using a twin-screw extruder, and comprising following steps:

mixing raw materials of each layer according to a mass ratio to prepare raw material master batches of each layer;

determining a number of barrels corresponding to each layer according to a number of processing layers required by each layer, and adding raw materials, followed by film lifting at a die orifice, blow molding, over-traction and winding to obtain the multifunctional controllable multi-layer co-extruded biodegradable mulching film.

8. The preparation method of the multifunctional controllable multi-layer co-extruded biodegradable mulching film according to claim 7, wherein a step of preparing a coating layer is further comprised, wherein the step of preparing the coating layer comprises: coating the raw materials of the coating layer on a surface of the controlled release layer, wherein a dosage of effective components of the raw materials of the coating layer is 0.05-0.75 g/m$^2$.

* * * * *